March 12, 1963  T. H. STROME  3,081,214
METHOD OF BONDING POLYETHYLENE TO CORONA
DISCHARGE TREATED POLYETHYLENE
TEREPHTHALATE
Filed Oct. 13, 1959

INVENTOR
THOMAS H. STROME

BY *Mason, Porter, Diller & Stewart,*

ATTORNEYS

United States Patent Office 3,081,214
Patented Mar. 12, 1963

3,081,214
METHOD OF BONDING POLYETHYLENE TO CORONA DISCHARGE TREATED POLYETHYLENE TEREPHTHALATE
Thomas Henry Strome, Gambier, Ohio, assignor to Continental Can Company, Inc., New York, N.Y., a corporation of New York
Filed Oct. 13, 1959, Ser. No. 846,161
2 Claims. (Cl. 156—272)

This invention relates to the bonding of polyethylene upon substrate materials, by prior treatment of the substrates before applying the polyethylene coating thereto.

It is particularly of value for bonding a polyethylene surface to the substrate when the substrate surface has printing thereon with inks having a nitrocellulose or polyamide base.

An object of the invention is the provision of a method of pre-treating the substrate surface so that it is made receptive to the polyethylene.

Another object is the provision of a method which permits effective continuous bonding of extruded polyethylene to a substrate, by pre-treatment of the substrate.

With these and other objects in view, as will appear in the course of the following description and claims, an illustrative practice is shown on the accompanying drawings, in which:

It is well known to extrude molten polyethylene to form a film and then press this film against a substrate to form a laminate. This is effective to produce a satisfactory bond with some substrates, such as paper: but with other desirable materials such as ethylene glycol terephthalate polymer or cellulose ester, e.g., the acetate, the bonding is extremely weak or absent. It has been proposed to pre-activate the polyethylene film, by surface oxidation or corona discharge: and to employ a primer or bonding interlayer. It is often desired to have decoration on the final laminate product: like activation of the polyethylene is necessary for printing thereon. When the printing is performed upon the substrate, e.g., with inks having nitrocellulose or polyamide base, the polyethylene does not establish a firm bond thereto.

It has been found that substrate materials, including ethylene glycol terephthalate polymer, cellulose ester compounds such as the acetate, regenerated cellulose such as cellophane and parchment, and vinyl and vinylidene chloride polymers, both as such and with coatings thereon selected from the vinyl and vinylidene halide polymers, or with printed designs thereon made with nitrocellulose or polyamide inks of commercial type, can be subjected to corona discharge and thereby be so activated that upon contact with molten polyethylene, a firm bonding can be effected.

Figure 1:
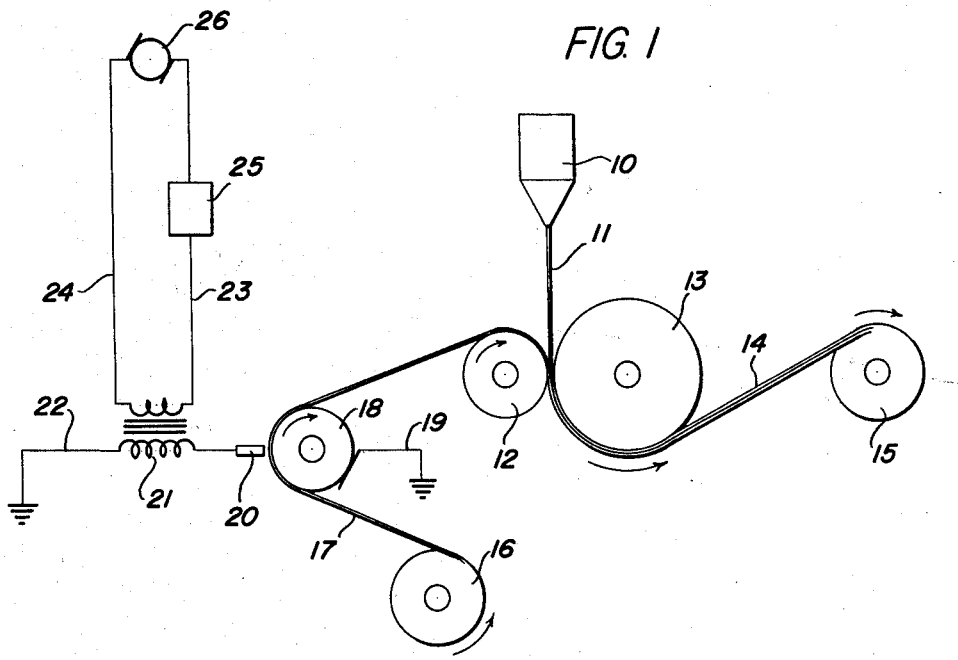
FIGURE 1 is a perspective view showing the bonding of an extruded film upon a substrate web, according to this invention.

FIGURE 1 shows an illustrative practice in which a substrate web 17, e.g., of cellulose acetate or ethylene glycol terephthalate polymer, is fed from a supply roll 16 to a metal roller 18. The roller 18 is grounded from its surface by a conductor 19. An electrode 20 is positioned opposite the roller 18, e.g., as a bar extending parallel to the roller surface. The high voltage terminals of a transformer 21 are joined to the electrode 20 and to ground by a conductor 22. The transformer has a primary winding joined by conductors 23, 24 to a generator 26, with inclusion of means shown conventionally at 25 for controlling the output voltage of the transformer 21. From roller 18, the substrate moves to the roller 12, at which its treated surface is brought into contact with molten polyethylene film 11 from the extruder 10. The still-plastic extruded polyethylene film is brought against the activated substrate web surface; and the web and film are pressed together between the roller 12 and a counterroller 13 of metal and having an internal cooling as by water in known manner. The cold roller 13 solidifies the polyethylene film from its exposed surface while the bonding is being effected: and upon the bonding the cooling of the contacting surfaces brings the materials to essentially room temperature. The bonded laminate web 14 is led from the roller 13 to a take-up roll 15.

The generator 26 delivers a high frequency alternating electric current to the transformer 21, with a frequency of 2,600 cycles per second or over, with a primary current adjustable between one and four amperes and voltages of 100 to 250 for a substrate 24 inches wide. The secondary voltage at the gap between the electrode 20 and the ground roll 18 can be from 3,000 to 10,000, so that a corona discharge occurs.

The rollers 12, 13 can be driven at rates to cause the film 11 and substrate 17 to move at 50 to 200 feet per minute.

An illustrative condition was to have the corona gap 0.025 inch to the adjacent surface of the substrate, with a substrate web 24 inches wide and 0.001 inch thick and moving 125 feet per minute. A gap potential of 3,000 volts was used, with a primary circuit current of 3 amperes. The polyethylene film 11 was extruded at a temperature of 600 degrees F. and reached rollers 12, 13 at a temperature substantially above 300 degrees F. The web 17 was at room temperature as it reached the roller 12. In passing around the roller 18, the substrate web 17 is subjected to the corona discharge, with bombardment by ionized air particles, and with a minor momentary heating from the discharge apparatus, the heat being quickly dissipated so that the web is substantially at room temperature when it reaches the roller 12 and comes into contact with the polyethylene film 11. By "room temperature" is meant a tempeature of 100 degrees F. or below.

The substrate web can have its contact surface of polyester such as ethylene glycol terephthalate polymer, cellulose ester such as the acetate, vinyl or vinylidene chloride, or of regenerated cellulose such as cellophane and parchment. The substrate web can be a mono-film of such material, or a laminate of such material upon paper, vegetable parchment, cellophane or other base. The contact surface may be bare, or may have designs or lettering thereon made with inks having a nitrocellulose or polyamide base. A typical formula for a nitrocellulose ink is:

|  | Percent |
|---|---|
| Nitrocellulose | 12 |
| Plasticizer (dibutyl phthalate) | 6 |
| Pigment | 36 |
| Solvent | 46 |

A typical polyamide ink formula is:

|  | Percent |
|---|---|
| Polyamide resin | 13 |
| Nitrocellulose | 6 |
| Pigment | 24 |
| Solvent | 57 |

It will be understood that the pigment can include both solid particles having opaquing and coloring properties, and dyes compatible with the composition for determining a desired color and shade for the portion of the substrate surface to be printed therewith. Such formulations are illustrative of inks which are commercially available for rotogravure printing. The substrate web 17 can have such designs and lettering printed thereon before it is wound into the supply roll 16, at the surface which is to be outermost at roll 18 and thus exposed to the corona effect, and which is to come in contact with the extruded polyethylene film as the two enter between the rollers 12, 13. That is, such decorative coatings are present between the substrate web proper and the polyethylene film in the laminate product 14.

Illustrative of the effects of the process are the comparisons of bonds prepared in alternate ways. When it is sought to directly bond extruded polyethylene film to a web of ethylene glycol terephthalate polymer or cellulose acetate, the result is nil. When a primer coating is employed, bonds of 100 to 1,000 grams per inch can be obtained. Employing the present process, without a primer coating, bonds in excess of 1,000 grams per inch are attained.

Figure 2:
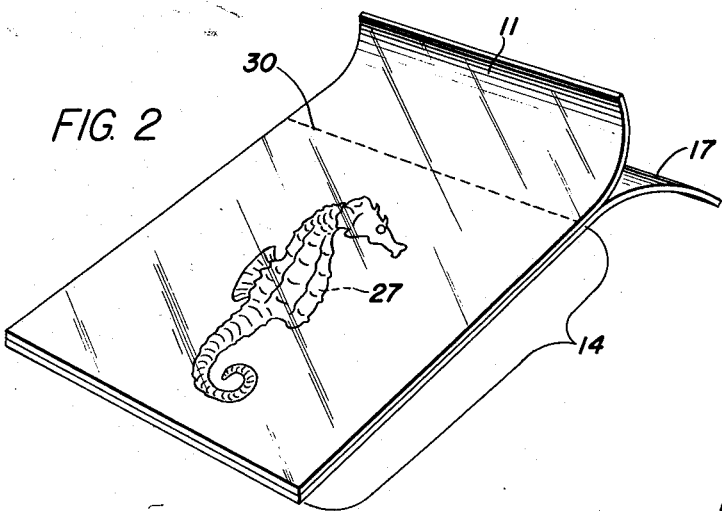
FIGURE 2 is a perspective view of a section of the produced material.

The laminate product is shown in FIGURE 2, in which the portion 14 has its components bonded with the aforesaid strength, while the portions 11, 17 show the approach of the two components to the bonding region 30, with the decoration 27 which was present on the substrate 17 being visible through the overlying polyethylene layer 11 bonded firmly to the substrate and the decoration.

It will be understood that the illustrative practice and products are not restrictive, and that the invention can be practiced in many ways within the scope of the appended claims.

What is claimed is:

1. A method of bonding two separate bodies of material together so as to form a laminate, one of said bodies being a film of polyethylene and the other of said bodies being a substrate web having a surface of ethylene glycol terephthalate polymer, which comprises subjecting the ethylene glycol terephthalate polymeric surface of the substrate web while at room temperature to a corona discharge, and then pressing a film of polyethylene while at a temperature above 300 degrees F. upon the corona treated surface of the substrate web so as to form a laminate from said separate bodies of material.

2. The method as in claim 1, in which the surface of the substrate web to be brought into contact with the polyethylene film is decorated with an inked design before it is subjected to the corona discharge treatment and therewith a three layer laminate is produced with the said bodies at the outside and the inked design present between the bodies.

References Cited in the file of this patent
UNITED STATES PATENTS

| | | |
|---|---|---|
| 2,714,571 | Irion et al. | Aug. 2, 1955 |
| 2,802,085 | Rothacker | Aug. 6, 1957 |
| 2,923,964 | Plonsky | Feb. 9, 1960 |

FOREIGN PATENTS

| | | |
|---|---|---|
| 722,875 | Great Britain | Feb. 2, 1955 |